(12) United States Patent
Abhyanker et al.

(10) Patent No.: US 8,190,357 B2
(45) Date of Patent: May 29, 2012

(54) MULTI-OCCUPANT STRUCTURE IN A GEO-SPATIAL ENVIRONMENT

(75) Inventors: Raj Vasant Abhyanker, Cupertino, CA (US); Chandrasekhar Thota, Palo Alto, CA (US)

(73) Assignee: Google Inc., Mountain View, CA (US)

( * ) Notice: Subject to any disclaimer, the term of this patent is extended or adjusted under 35 U.S.C. 154(b) by 1471 days.

(21) Appl. No.: 11/725,652

(22) Filed: Mar. 19, 2007

(65) Prior Publication Data

US 2007/0219659 A1 Sep. 20, 2007

Related U.S. Application Data

(60) Provisional application No. 60/854,230, filed on Oct. 25, 2006, provisional application No. 60/853,499, filed on Oct. 19, 2006, provisional application No. 60/817,470, filed on Jun. 28, 2006, provisional application No. 60/783,226, filed on Mar. 17, 2006.

(51) Int. Cl.
*G01C 21/00* (2006.01)

(52) U.S. Cl. ........................................ 701/408; 701/400

(58) Field of Classification Search .................. 701/208, 701/400–408
See application file for complete search history.

(56) References Cited

U.S. PATENT DOCUMENTS

| | | | |
|---|---|---|---|
| 7,076,409 | B2 | 7/2006 | Agrawala et al. |
| 7,158,878 | B2 | 1/2007 | Rasmussen et al. |
| 2006/0026170 | A1 | 2/2006 | Kreitler |
| 2006/0047825 | A1 | 3/2006 | Steenstra |
| 2006/0058952 | A1 | 3/2006 | Copper |
| 2006/0064346 | A1 | 3/2006 | Steenstra et al. |
| 2006/0080032 | A1 | 4/2006 | Copper |

OTHER PUBLICATIONS

Platial the People's Atlas; http://www.platial.com/splash.
Pushpin : Better maps for online apps. Delight. Illuminate. Differentiate., htttp://www.pushpin.com.
Yelp : Real People. Real Reviews, http://www.yelp.com/search?find_loc=San+Francisco%2C+CA+94101&radius=10.0&cflt=restaurants&start=0&sortby=rating.
Zillow.com; http://www.zillow.com/search/Search.htm?addrstrthood=&citystatezip=56786&GOButton=%3CSPAN%3EGO%3C%2FSPAN%3E.
Plazes knows where—Share your location, Explore the world, Locate friends, http://beta.plazes.com/.
Following the Dollars : Map Political campaign contributions in your area., http://www.cs.indiana.edu/cgi-pub/markane/projectFinal3.cgi?zipCode=78654.
Find it, Map it, Get shopping restaurants, directions and traffic with Live Search for Windows Mobile, http://local.live.com/default.aspx?v=2&FORM=MOCARJ&cp=36.099233~-115.175.

*Primary Examiner* — Michael Misiaszek

(57) ABSTRACT

A method, apparatus, and system of multi-occupant structure in a geo-spatial environment are disclosed. In one embodiment, a method includes determining that a marker (e.g., associated with a profile of a user) is colliding with another marker simultaneously displayed in a map based on an overlap area of the marker with the another marker, automatically creating a group pointer that replaces the marker and the another marker on the map and generating a view of the marker and the another marker when a user (e.g., of the geo-spatial environment) selects the group pointer.

15 Claims, 16 Drawing Sheets

| NAME 702 | PROFILE STATUS 704 | UNIT DATA 706 | POINTER TYPE 708 | MARKER STATUS 710 |
|---|---|---|---|---|
| LAURA D'SILVA | CLAIMED | 5TH FLOOR | COMMERCIAL | LOCKED |
| JANE | UNCLAIMED | 5TH FLOOR | RESIDENTIAL | UNLOCKED |
| ● ● ● | ● ● ● | ● ● ● | ● ● ● | ● ● ● |

MULTI-OCCUPANT STRUCTURE IN A GEO-SPATIAL ENVIRONMENT

CLAIMS OF PRIORITY

This patent application claims priority from:
(1) U.S. Provisional patent application No. 60/783,226, titled 'Trade identity licensing in a professional services environment with conflict' filed on Mar. 17, 2006.
(2) U.S. Provisional patent application No. 60/817,470 titled 'Segmented services having a global structure of networked independent entities', filed Jun. 28, 2006.
(3) U.S. Provisional patent application No. 60/853,499, titled 'Method and apparatus of neighborhood expression and user contribution system' filed on Oct. 19, 2006.
(4) U.S. Provisional patent application No. 60/854,230 titled 'Method and apparatus of neighborhood expression and user contribution system' filed on Oct. 25, 2006.
(5) U.S. Utility patent application No. 11/603,442 titled 'Map based neighborhood search and community contribution' filed on Nov. 22, 2006.

FIELD OF TECHNOLOGY

This disclosure relates generally to the technical fields of communications and, in one example embodiment, to a method, apparatus, and system of multi-occupant structure in a geo-spatial environment.

BACKGROUND

A structure (e.g., a mine, a tunnel, a shopping mall, an apartment building, an office building, etc.) may have a number of occupants (e.g., workers, cars, people, residents, staff, machines, etc.) A geo-spatial environment (e.g., Microsoft® Virtual Earth, Google® Earth, Fatdoor®, Platial®, Mapquest®, Zillow®, ZipRealty® etc.) may attempt to concurrently represent the multiple occupants in the structure on a map (e.g., a 3-dimensional view, a satellite view, etc.) through a set of markers (e.g. pushpins, indicators, etc.).

The set of markers may each take up a number of pixels on the map. As a result, the set of markers may collide with each other, so as to overlap. In some instances, a location data (e.g., address data) of different occupants of the structure may be the same (e.g., separated only by unit number, apartment number, suite number, etc.). In this scenario, markers associated with the different occupants sharing the same location data may completely overlap. It may be difficult to tell how many occupants there are in the structure. Also, it may be difficult to browse in the geo-spatial environment because markers may be stacked atop each other and may not be selectable by a user.

SUMMARY

A method, apparatus and system of multi-occupant structure in a geo-spatial environment are disclosed. In one aspect, a method includes determining that a marker is colliding with another marker simultaneously displayed in a map based on an overlap area of the marker with the another marker, automatically creating a group pointer that replaces the marker and the another marker on the map, and generating a view of the marker and the another marker when a user selects the group pointer.

The method may further include generating a residential group pointer in place of the group pointer when the marker and the another marker are associated with a shared residential structure, generating a commercial group pointer in place of the group pointer when the marker and the another marker are associated with a shared commercial structure, generating an industrial group pointer in place of the group pointer when the marker and the another marker are associated with a shared industrial structure, generating an interior space pointer in place of the group pointer when the marker and the another marker are associated with a shared shopping mall, a shared mine, a shared tunnel, a shared amusement park, a shared private property, and/or a shared interior space, and generating a family pointer in place of the interior space pointer when the marker and the another marker are associated with members of a same family residing in the shared interior space.

In addition, the method may include generating a multiple-structure group pointer when the marker and the another marker are associated with adjacent structures which are not shared by occupants identified through the marker and the another marker. Also, the method may include determining that the marker, the another marker, and different markers are associated with a shared structure based on an address data associated with the occupants represented through the marker, the another marker and the different markers. The method may further include automatically allocating each one of the marker, the another marker, and the different markers in a set of floors of the shared structure based on a unit data associated with the address data of the occupants represented through the marker, the another marker and the different markers.

Moreover, the method may include providing a wiki interface such that the occupants represented through the marker, the another marker, and the different markers modify an automatically determined allocation of each one of the marker, the another marker, and the different markers in the set of floors of the shared structure through at least one of a drag and drop interface and a pick and place interface. Additionally, the method may include altering a latitude, a longitude, and altitude position of a particular marker when the marker, the another marker, and/or the different markers are moved.

The method may further include locking the wiki interface of the particular marker when a particular occupant associated with the particular marker claims a profile associated with the particular marker and elects to control placement of the marker themselves. Also, the method may include permitting users of a geo-spatial environment to contribute content in a form of a textual content, a video content, and/or a pictorial content about the particular occupant through the wiki interface in the profile of the particular occupant until the particular occupant locks the wiki interface and elects to control contribution to the profile. The method may include providing through the wiki interface a way such that the occupants move the marker, the another marker, and the different markers to different buildings and/or structures in the geo-spatial environment when the marker, the another marker, and the different markers are misplaced.

In addition, the method may include generating a floor constructor wiki in which the occupants create layouts of different floor plans and/or hallways of the shared structure, such that new and/or existing markers are moved to the different floor plans and/or hallways as constructed through the floor constructor wiki. Furthermore, the method may include providing a voting interface such that occupants of the shared structure elect a particular layout of a particular floor as one that is to be locked and used to represent a central map of the new and/or existing markers for the particular floor. A moderator among the occupants may have privileges to unlock the elected particular layout.

The method may also include enabling commerce among the occupants of the shared structure through a community bulletin board that only verified occupants of the shared structure contribute to and have access to, such that the occupants barter, exchange, buy and/or sell goods and/or services among only other occupants of the shared structure. In addition, the method may include providing a grouping interface to the occupants of the shared structure to form social, professional, and/or collective purchasing groups with other occupants of the shared structure in the geo-spatial environment.

In another aspect, a system includes a structure having a plurality of occupants, a geo-spatial environment to represent the structure in a map, and a pointer in the geo-spatial environment to simultaneously represent the plurality of occupants such that the pointer enables a user to get access to a set of profiles associated with each of the plurality of occupants of the structure through the pointer. The system may further include a wiki module such that the pointer may be movable to any location on the map by any user of the geo-spatial environment until it is claimed by a moderator of the structure. The system may also include a floor constructor module to create a layout of the structure in the geo-spatial environment through a wiki-based architectural blueprint creator tool of the floor constructor module such that any occupant of the structure can modify the layout until the moderator of the structure locks the layout by claiming the structure.

In yet another aspect, a method includes placing a set of markers in a map, simultaneously displaying the set of markers with each other in the map based on a location data associated with each of the set of markers, creating a pointer when different ones of the set of markers overlap with each other because of having at least one of a same location data and an adjacent location data with each other, and customizing the pointer based on at least one of a neighborhood and relationship characteristic between the different ones of the set of overlapping markers.

The method may include providing an interface such that the set of markers and the pointer are individually and in combination movable and such that profiles of occupants identifiable through the set of markers are modifiable by users of a geo-spatial social network until the profiles are claimed by individual occupants of a location marked through each of the set of markers.

The methods, systems, and apparatuses disclosed herein may be implemented in any means for achieving various aspects, and may be executed in a form of a machine-readable medium embodying a set of instructions that, when executed by a machine, cause the machine to perform any of the operations disclosed herein. Other features will be apparent from the accompanying drawings and from the detailed description that follows.

BRIEF DESCRIPTION OF THE DRAWINGS

Example embodiments are illustrated by way of example and not limitation in the figures of the accompanying drawings, in which like references indicate similar elements and in which:

FIG. 7 is a table view of occupant details in the geo-spatial environment, according to one embodiment.

Other features of the present embodiments will be apparent from the accompanying drawings and from the detailed description that follows.

DETAILED DESCRIPTION

A method, apparatus, and system of multi-occupant structure in a geo-spatial environment are disclosed. In the following description, for the purposes of explanation, numerous specific details are set forth in order to provide a thorough understanding of the various embodiments. It will be evident, however, to one skilled in the art that the various embodiments may be practiced without these specific details.

In one embodiment, a method includes determining that a marker is colliding with another marker simultaneously displayed in a map based on an overlap area of the marker with the another marker, automatically creating a group pointer (e.g., the group pointer 904A of FIG. 9) that replaces the marker and the another marker on the map, and generating a view of the marker and the another marker when a user selects the group pointer In another embodiment, a system includes a structure (e.g., the structure 122 of FIG. 1) having a plurality of occupants, a geo-spatial environment (e.g., the geo-spatial environments 118A-N of FIG. 1) to represent the structure in a map, and a pointer (e.g., the pointer 120 of FIG. 1) in the geo-spatial environment to simultaneously represent the plurality of occupants such that the pointer enables a user (e.g., a resident, a business, a patron, etc.) to get access to a set of profiles associated with each of the plurality of occupants of the structure through the pointer.

Figure 10:
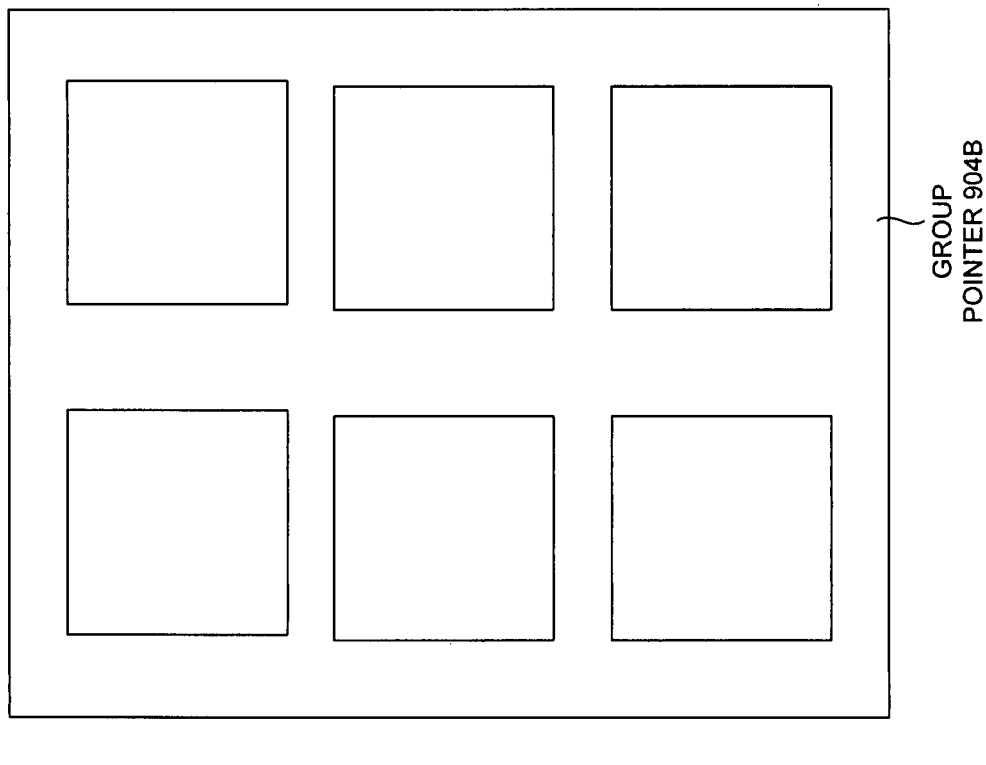
FIG. 10 is a schematic representation of replacing a set of overlapping markers with the group pointer in the geo-spatial environment, according to one embodiment.
Figure 10:
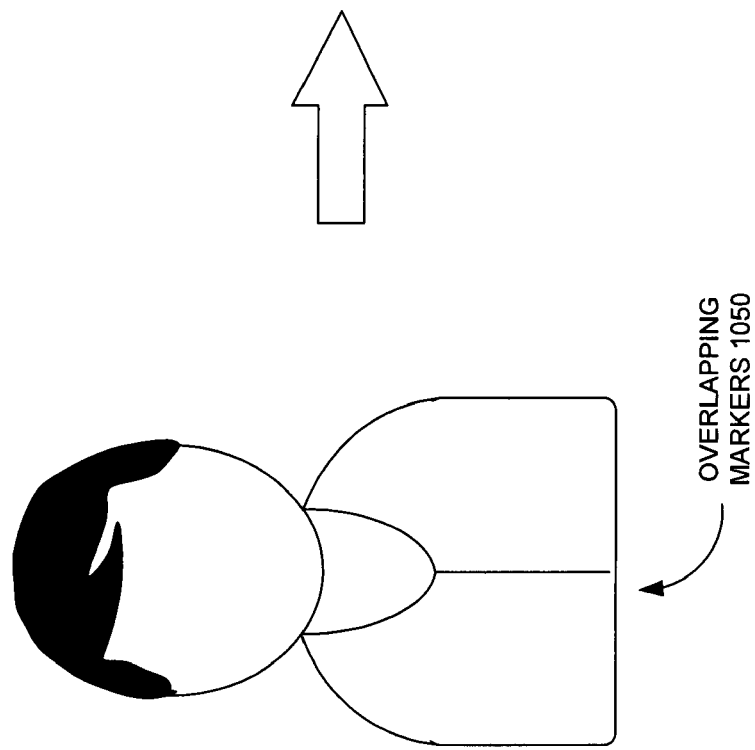

In yet another embodiment, a method includes placing a set of markers in a map, simultaneously displaying the set of markers with each other in the map based on a location data associated with each of the set of markers, creating a pointer (e.g., the pointer 120 of FIG. 1) when different ones of the set of markers overlap with each other because of having at least one of a same location data and/or an adjacent location data with each other, and customizing the pointer based on a neighborhood and/or relationship characteristic between the different ones of the set of overlapping markers (e.g., the overlapping markers 1050 of FIG. 10).

Figure 1:
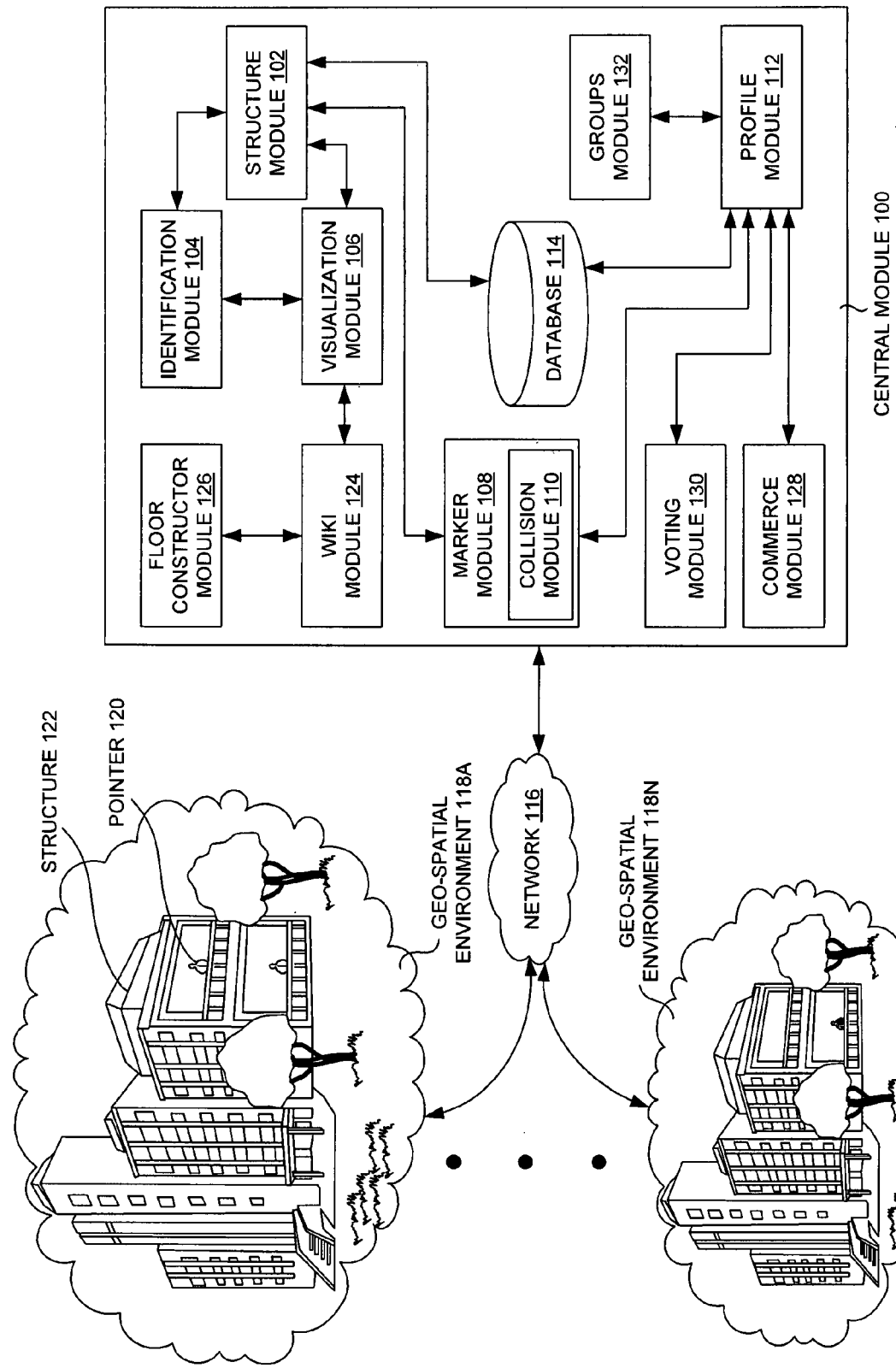
FIG. 1 is a system view of a central module communicating with geo-spatial environments through a network, according to one embodiment.

FIG. 1 is a system view of a central module 100 communicating with geo-spatial environments 118A-N through a network 116, according to one embodiment. Particularly, FIG. 1 illustrates the central module 100, a structure module 102, an identification module 104, a visualization module 106, a marker module 108, a collision module 110, a profile module 112, a database 114, the network 116, the geo-spatial environments 118A-N, a pointer 120, a structure 122, a wiki module 124, a floor constructor module 126, a commerce module 128, a voting module 130 and a groups module 132, according to one embodiment.

The central module 100 may coordinate automatic creation of a group pointer by replacing overlapping markers (e.g., representing a number of occupants in a shared structure) and/or may facilitate creation of layouts of a particular floor in the shared structure associated with the occupants in the geo-spatial environments 118A-N. The structure module 102 may generate different structures (e.g., a residential structure, a commercial structure and/or an industrial structure, etc.) associated with the occupants in the geo-spatial environments 118A-N. The identification module 104 may identify and/or distinguish the occupants in the shared structure based on different markers associated with an address data of the occupants.

The visualization module 106 may generate a three dimensional map view where users of the geo-spatial environments 118A-N access profiles of the occupants associated with the shared structure(s). The visualization module 106 may also display a set of makers and the pointer(s) 120 representing the plurality of occupants of the shared structure (e.g., the structure 122 of FIG. 1). In addition, the visualization module 106 may enable visualization of a layout of different floors of the shared structure. The marker module 108 may generate the set of markers that displays profiles of the occupants in the geo-spatial environments 118A-N. The collision module 110 may determine whether a marker and another marker associated with the occupants of the shared structure collide with each other when a user selects a particular marker to visualize the profiles of the occupants of the shared structure.

The profile module 112 may enable creation of profiles of the occupants identifiable through the set of markers in the geo-spatial environments 118A-N. The database 114 may contain the address data and/or content data associated with the profiles of the occupants of the shared structures of the geo-spatial environments 118A-N. The network 116 may facilitate communication between users (e.g., the occupants of the shared structure 122) of the geo-spatial environments 118A-N through the central module 100. The geo-spatial environments 118A-N may consist of various structures where the occupants reside and communicate with each other.

The pointer 120 may be an indicator representing a set of colliding markers associated with the plurality of occupants in the shared structures of the geo-spatial environments 118A-N. The structure 122 (e.g., a shared structure) may be a residential structure, a commercial structure, an industrial structure, etc. associated with the occupants in the geo-spatial environments 118A-N. The wiki module 124 may provide a wiki interface where the occupants modify automatically determined allocation of the markers associated with the shared structures and/or adjacent structures which are not shared by the occupants of the geo-spatial environments 118A-N.

The wiki module 124 may also provide the wiki interface such that the users of the geo-spatial environments 118A-N contribute content to the profiles of the occupants until the profiles are claimed and locked by the occupants. In addition, the occupants may modify the layout of the different floor plans and/or hallways of the shared structure in the geo-spatial environments 118A-N through the wiki interface provided by the wiki module 124 (e.g., until a particular elected layout is locked by a moderator). The floor constructor module 126 may create the layout of the floor plan and/or hallways of the shared structure in the geo-spatial environments 118A-N so that new and existing markers are moved to correct positions.

The commerce module 128 may enable commerce through the community bulletin board such that the occupants barter, exchange, buy and/or sell goods and/or services among other occupants of the shared structure. The voting module 130 may provide a voting interface for the occupants of the shared structure to elect a particular layout of the floor plan of the shared structure(s). The groups module 132 may provide a grouping interface to the occupants of the shared structure to form social, professional and/or collective purchasing groups with the other occupants of the shared structure(s) of the geo-spatial environments 118A-N.

In the example embodiment illustrated in FIG. 1, the central module 100 communicates with the geo-spatial environments 118A-N through the network 116. The central module 100 consists of the structure module 102, the identification module 104, the visualization module 106, the marker module 108, the collision module 110, the profile module 112, the database 114, the wiki module 124, the floor constructor module 126, the commerce module 128, the voting module 130 and the groups module 132 communicating with each other, according to one embodiment.

A residential group pointer (e.g., the residential group pointer 800 of FIG. 8) may be generated in place of the group pointer when the marker and the another marker are associated with a shared residential structure. A commercial group pointer may be generated in place of the group pointer when the marker and the another marker are associated with a shared commercial structure. An industrial group pointer may be generated in place of the group pointer when the marker and the another marker are associated with a shared industrial structure. An interior space pointer may be generated in place of the group pointer when the marker and the another marker are associated with a shared shopping mall, a shared mine, a shared tunnel, a shared amusement park, a shared private property, and/or a shared interior space.

A family pointer may be generated in place of the interior space pointer when the marker and the another marker are associated with members of a same family residing in the shared interior space. A multiple-structure group pointer may be generated when the marker and the another marker are associated with adjacent structures which are not shared by occupants identified through the marker and the another marker. Association of the marker, the another marker, and the different marker with the shared structure may be determined based on an address data associated with the occupants represented through the marker, the another marker and the different markers.

Each one of the marker, the another marker, and the different markers may be allocated automatically in a set of floors of the shared structure based on a unit data associated with the address data of the occupants represented through the marker, the another marker and the different markers. A latitude, a longitude and an altitude position of a particular marker may be altered when the marker, the another marker, and/or the different markers are moved. The wiki interface (e.g., provided by the wiki module 124 of FIG. 1) of the particular marker may be locked when a particular occupant associated with the particular marker claims a profile associated with the particular marker and elects to control placement of the marker themselves.

A way may be provided through the wiki interface such that the occupants move the marker, the another marker, and/or the different markers to different buildings and/or structures in the geo-spatial environment 118A-N when the marker, the another marker, and the different markers are misplaced. A floor constructor wiki in which the occupants create (e.g., using the floor constructor module 126 of FIG. 1) layouts of different floor plans and/or hallways of the shared structure may be generated such that new and/or existing markers are moved to the different floor plans and/or hallways as constructed through the floor constructor wiki.

The voting interface (e.g., generated by the voting module 130 of FIG. 1) may be provided such that occupants of the shared structure elect a particular layout of a particular floor as one that is to be locked and used to represent a central map of the new and/or existing markers for the particular floor. Commerce among the occupants of the shared structure may be enabled (e.g., through the commerce module 128 of FIG. 1) through the community bulletin board that only verified occupants of the shared structure contribute to and have access to, such that the occupants barter, exchange, buy and/or sell goods and/or services among only other occupants of the shared structure.

The structure 122 may represent a structure having multiple occupants. The geo-spatial environments 118A-N may represent visualizations (e.g., map views) of neighborhoods (e.g., having residential and/or commercial structures, etc.). The pointer 120 in the geo-spatial environment (e.g., the geospatial environments 118A-N of FIG. 1) may simultaneously represent the plurality of occupants such that the pointer 120 enables a user to get access to a set of profiles associated with each of the plurality of occupants of the structure 122 through the pointer 120. The wiki module 124 may enable any user of the geo-spatial environments 118A-N to move the pointer 120 to any location on the map until it is claimed by the moderator of the structure 122.

The floor constructor module 126 may create the layout of the structure 122 in the geo-spatial environments 118A-N (e.g., through a wiki-based architectural blueprint creator tool of the floor constructor module 126) such that any occupant of the structure 122 can modify the layout until the moderator of the structure 122 locks the layout by claiming the structure 122. The pointer 120 may be customized based on a neighborhood and/or relationship characteristic between the different ones of the set of overlapping markers.

An interface may be provided such that the set of markers and the pointer 120 are (e.g., individually and/or in combination) moveable and such that profiles of occupants identifiable through the set of markers are modifiable by users of a geo-spatial social network until the profiles are claimed by individual occupants of a location marked through each of the set of markers.

Figure 2:
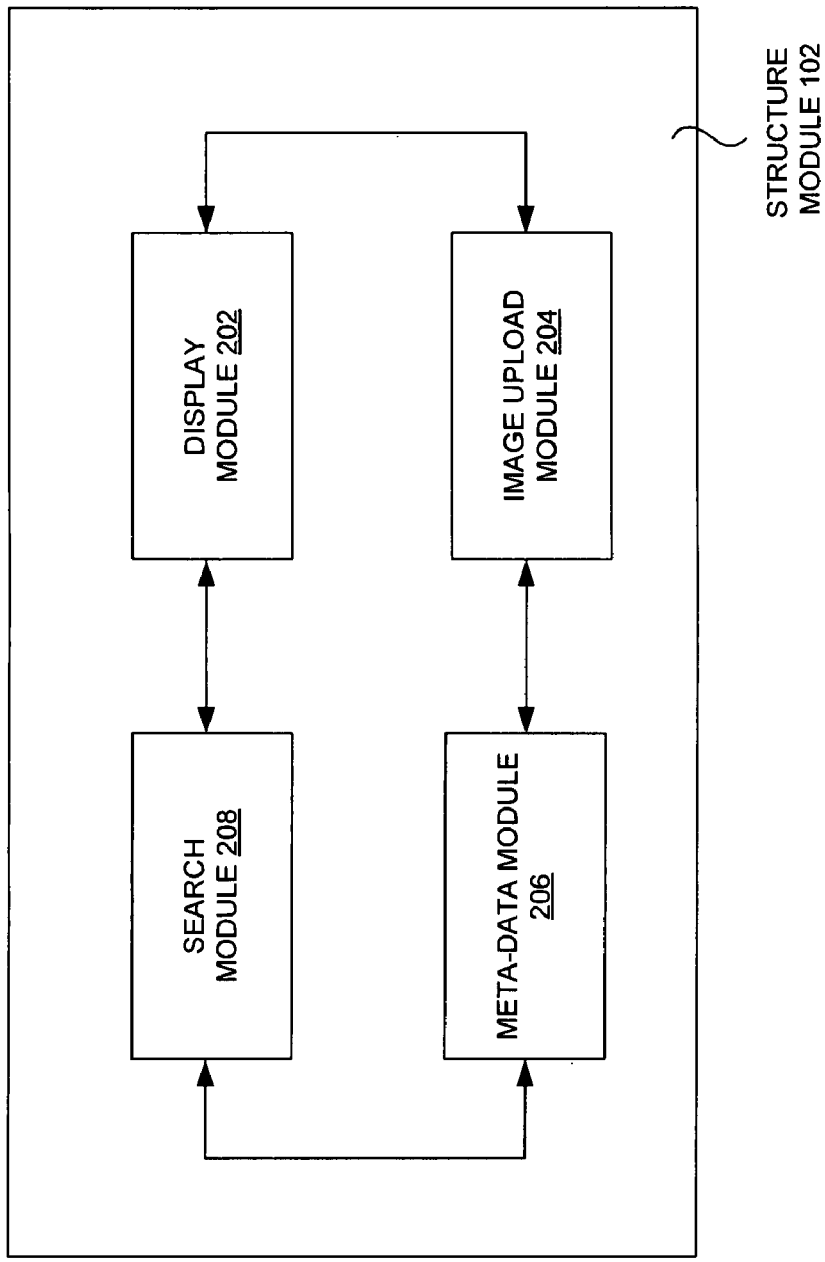
FIG. 2 is an exploded view of the structure module of FIG. 1, according to one embodiment.

FIG. 2 is an exploded view of the structure module 102 of FIG. 1, according to one embodiment. Particularly, FIG. 2 illustrates a display module 202, an image upload module 204, a meta-data module 206 and a search module 208, according to one embodiment.

The display module 202 may display in the map, the group pointer(s) representing the set of overlapping markers associated with the occupants in the shared structure(s) having same location data. The image upload module 204 may enable uploading of visual data to a profile associated with the occupant in the shared structure through the wiki interface provided by the wiki module (e.g., the wiki module 124 of FIG. 1) until the profile is claimed and locked by the occupant of the shared structure in the geo-spatial environment. The meta-data module 206 may generate the address data, the unit data and the location data associated with occupants of the shared structure (e.g., the structure 122 of FIG. 1, the shared residential structure, the shared commercial structure, the shared industrial structure, etc.) in the geo-spatial environment. The search module 208 may enable searching of the occupant(s) (e.g., the occupants may be represented by the set of markers in the geo-spatial environments) in the shared structure based on the location data, the unit data and/or the address data.

In the example embodiment illustrated in FIG. 2, the display module 202 communicates with the image upload module 204 and the search module 208. The meta-data module 206 communicates with the image upload module 204 and the search module 208. The users of the geo-spatial environment (e.g., the geo-spatial environment 118A-N of FIG. 1) may be permitted to contribute content (e.g., a textual content, a video content, and/or a pictorial content, etc.) about the particular occupant through the wiki interface (e.g., provided by the wiki module 124 of FIG. 1) in the profile of the particular occupant until the particular occupant locks the wiki interface and elects to control contribution to the profile.

Figure 3:
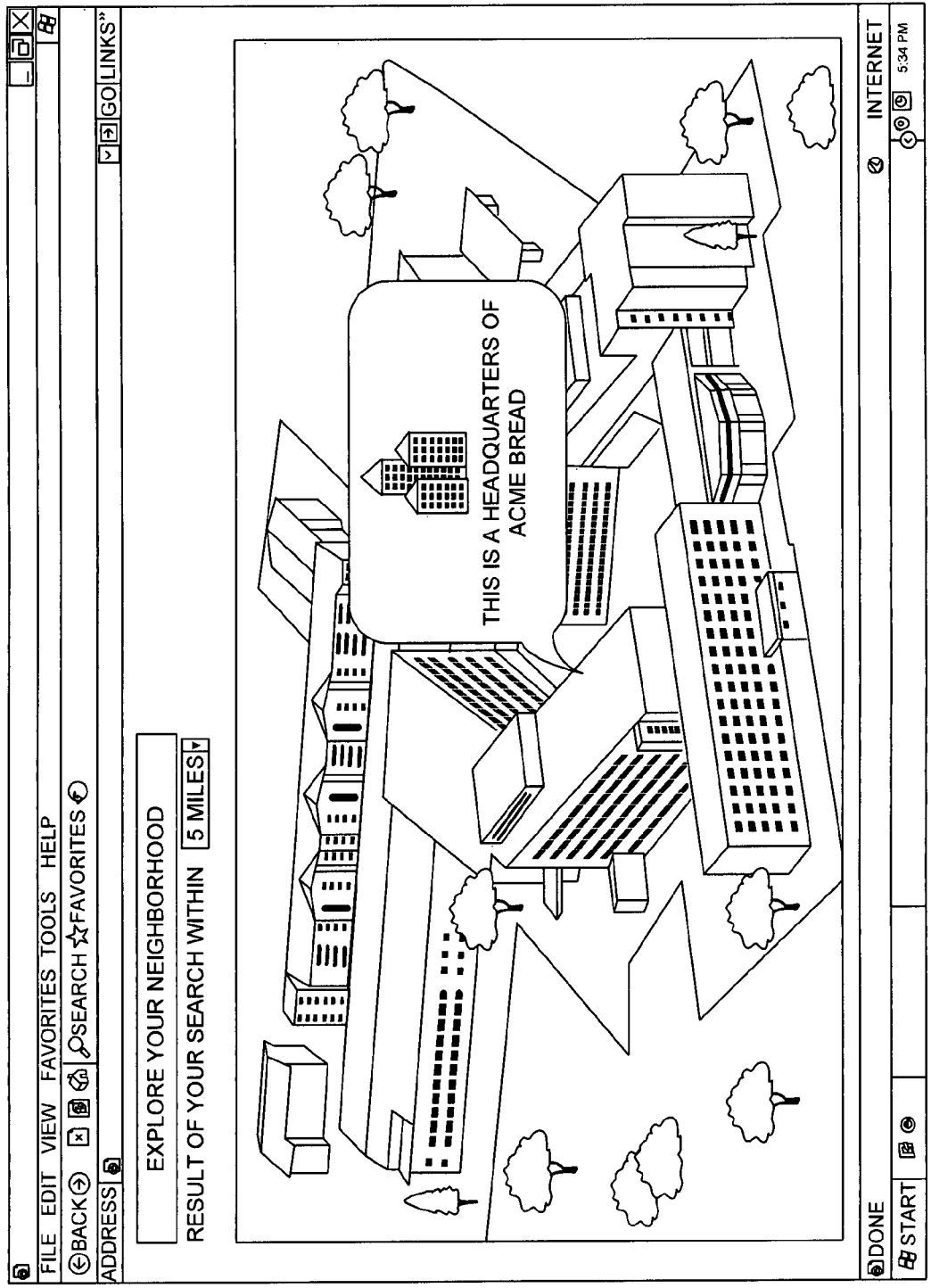
FIG. 3 is a user interface view of a shared structure in the geo-spatial environment, according to one embodiment

FIG. 3 is a user interface view of a shared structure (e.g., the structure 122 of FIG. 1) in the geo-spatial environment (e.g., the geo-spatial environments 118A-N illustrated in FIG. 1) according to one embodiment. In the example embodiment illustrated in FIG. 3, the user interface view 350 displays a headquarters of Acme Bread having multiple occupants represented by a set of markers in the geo-spatial environment. The markers may be allocated automatically in a set of floors of the headquarters of Acme Bread based on the unit data associated with the address data of the occupants represented through the markers.

The set of markers may be replaced by the group pointer when the different markers representing the occupants of the headquarters of acme bread collides with each other. A view of the set of markers may be generated when the user selects the group pointer (e.g., the group pointer 904A of FIG. 9) on the map.

Figure 4:
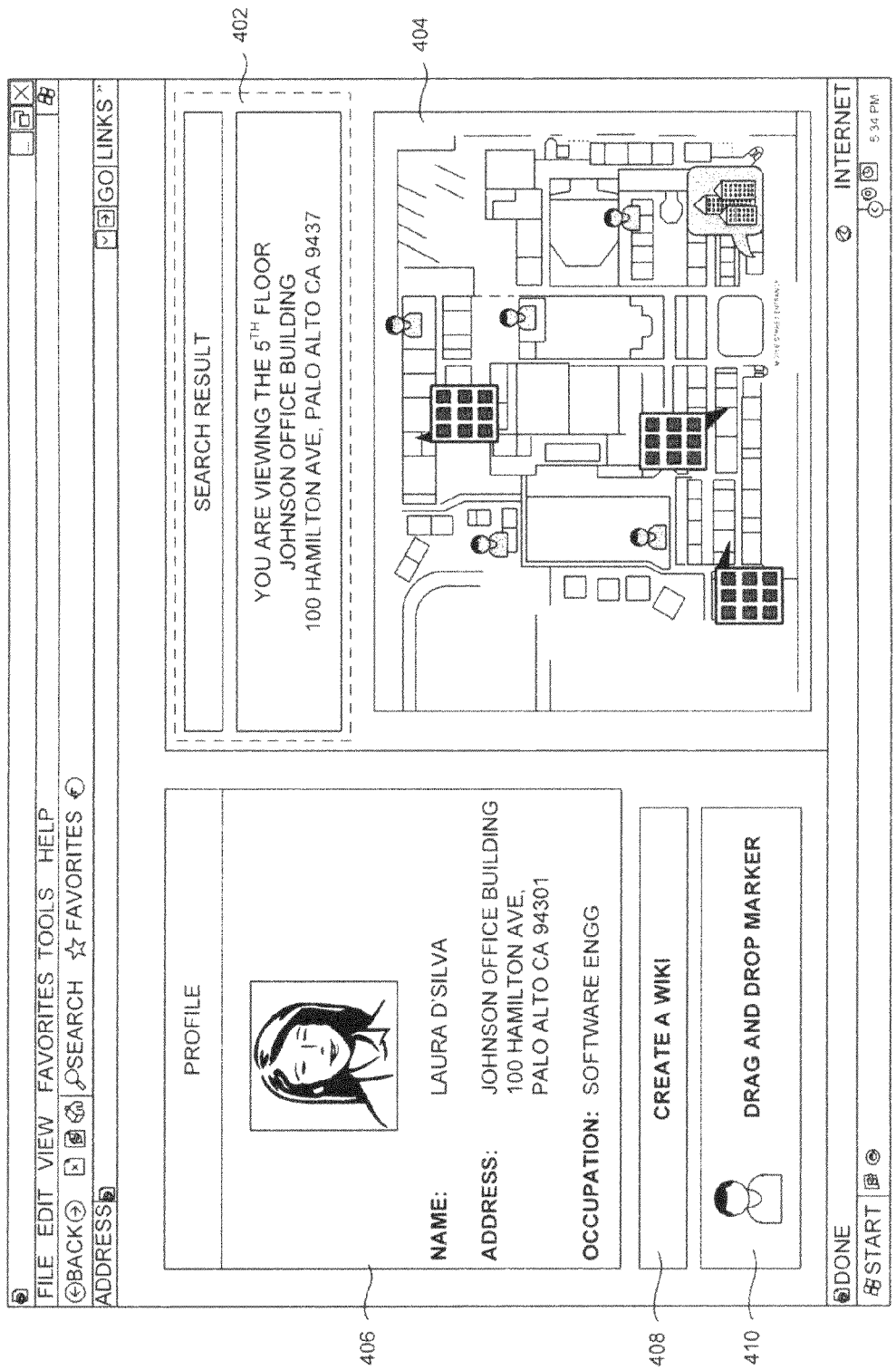
FIG. 4 is a user interface view of a floor constructor wiki, according to one embodiment.

FIG. 4 is a user interface view of a floor constructor wiki, according to one embodiment. Particularly, FIG. 4 illustrates a search result 402, a map view 404, a profile 406, a create a wiki option 408 and a drag and drop marker option 410, according to one embodiment.

The search result 402 may display results associated with the address data of the occupants of the shared structure represented through the set of markers in the geo-spatial environments 118A-N based on a search query requested by a user. The map view 404 may graphically display in the map, the set of markers and the group pointers associated with the shared structures in the geo-spatial environments 118A-N. The profile 406 may be a profile of an occupant located in the shared structure represented through the marker.

The create a wiki option 408 may enable the users to create, add and/or modify the content associated with a particular occupant in the neighborhood until the particular occupant associated with the shared structure claims the associated profile. The drag and drop marker option 410 may enable the occupants to modify automatically determined allocations of the marker, the another marker and/or the different markers in the set of floors of the shared structure (e.g., through a drag-and-drop interface).

In the example embodiment illustrated in FIG. 4, the user interface view 450 displays the profile information of the occupant "Laura D'Silva" along with the address data and profession data. The user interface view 450 also displays the search results along with the neighborhood view of the shared structures associated with the search query requested by the user (e.g., the occupant of the shared structure) in the geo-spatial environment. The user interface view 450 may enable the user to modify the location of the markers associated with the occupants of the shared structure (e.g., the structure 122 of FIG. 1).

The wiki interface may be generated (e.g., using the wiki module 124 of FIG. 1) such that the occupants represented through the marker, the another marker, and/or the different markers modify automatically determined allocations of each one of the marker, the another marker, and/or the different markers in the set of floors of the shared structure through the drag-and-drop interface and/or a pick-and-place interface.

Figure 5:
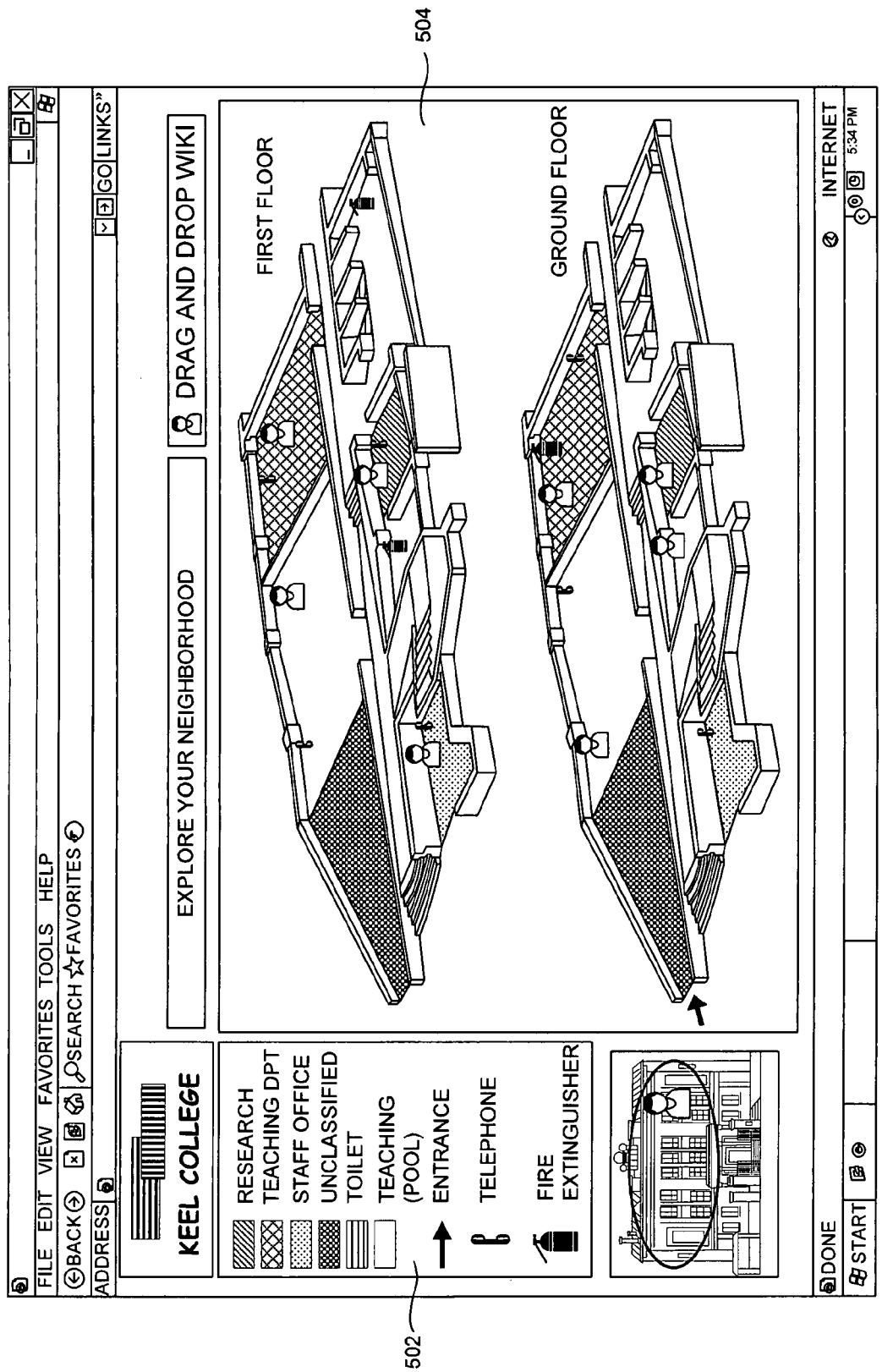
FIG. 5 is a user interface view of layout of different floors of the shared structure, according to one embodiment.

FIG. 5 is a user interface view of a layout of different floors of the shared structure, according to one embodiment. Particularly, FIG. 5 illustrates a block 502 and the layout 504, according to one embodiment.

The block 502 may be a visual representation of interior spaces, pathways and built-in elements (e.g., fixtures, exits, a telephone, a fire extinguisher, etc.) in a particular layout of a floor plan associated with a shared structure in the geo-spatial environment. The layout 504 may be a representation of the layout of different floors and/or hallways of the shared structure created by the occupants through a wiki-based architectural blueprint creator tool of the floor constructor module (e.g., the floor constructor module 126 of FIG. 1). The layout 504 can be modified by the occupants of the structure until the moderator locks the particular layout. The new and/or existing markers in the layout of the particular floor (e.g., ground floor, first floor, etc.) may be moved by the occupants in the geo-spatial environment through the drag and drop interface and/or the pick and place interface.

In the example embodiment illustrated in FIG. 5, the user interface view 550 displays the layout of the different floor plans and hallways of Keel College. The block 502 displays the symbolic representation of a research and a teaching department, a staff office, an unclassified area, a toilet, an entrance, a telephone and a fire extinguisher. The layout 504 displays the layout of a ground floor and a first floor of the Keel College created (e.g., by the occupants of the Keel College) using the floor constructor-wiki.

Figure 6:
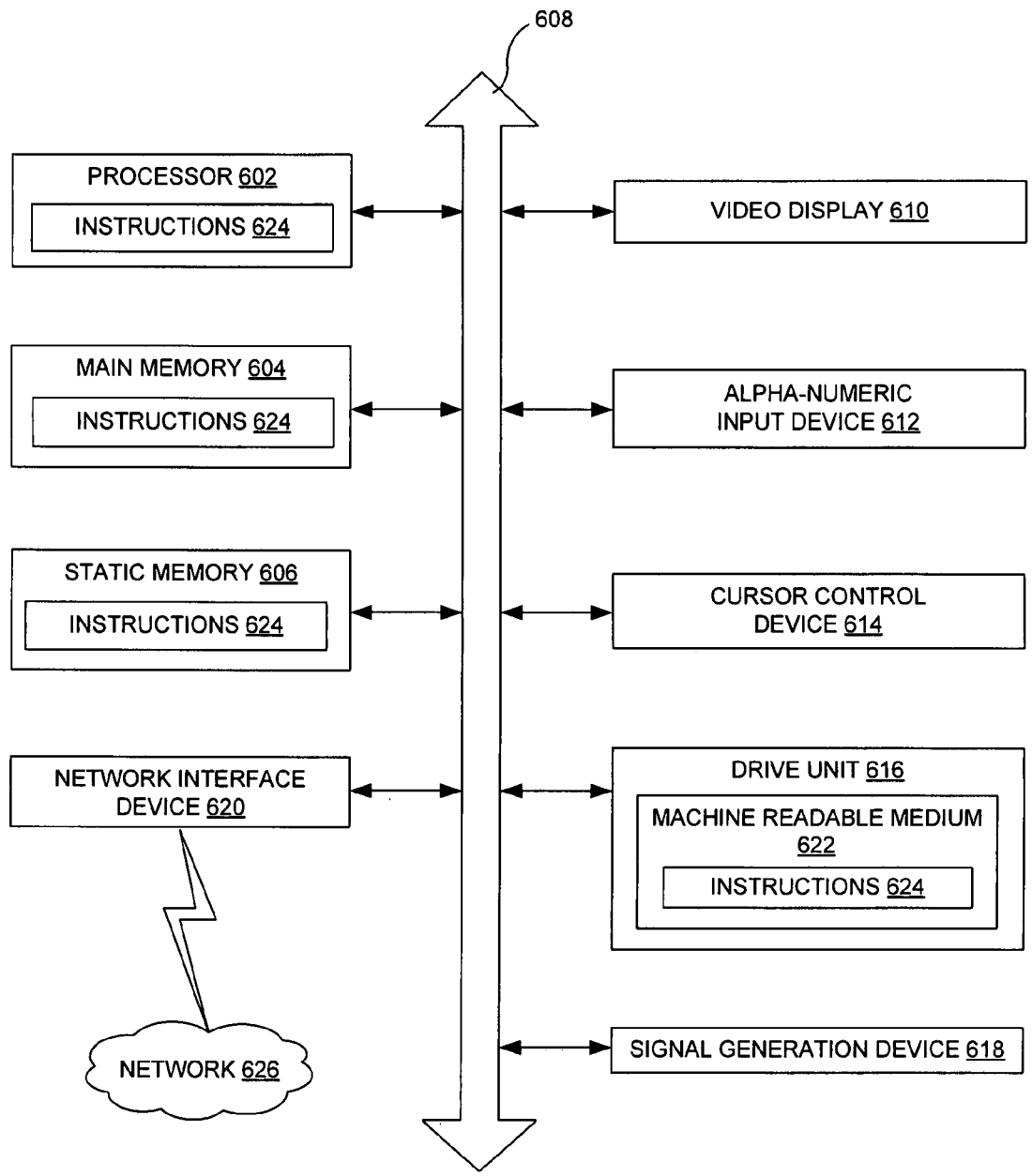
FIG. 6 is a diagrammatic system view of a data processing system in which any of the embodiments disclosed herein may be performed, according to one embodiment.

FIG. 6 is a diagrammatic system view 600 of a data processing system in which any of the embodiments disclosed herein may be performed, according to one embodiment. Particularly, the diagrammatic system view 600 of FIG. 6 illustrates a processor 602, a main memory 604, a static memory 606, a bus 608, a video display 610, an alpha-numeric input device 612, a cursor control device 614, a drive unit 616, a signal generation device 618, a network interface device 620, a machine readable medium 622, instructions 624, and a network 626, according to one embodiment.

The diagrammatic system view 600 may indicate a personal computer and the data processing system in which one or more operations disclosed herein are performed. The processor 602 may be a microprocessor, a state machine, an application specific integrated circuit, a field programmable gate array, etc. (e.g., Intel® Pentium® processor). The main memory 604 may be a dynamic random access memory and/or a primary memory of a computer system.

The static memory 606 may be a hard drive, a flash drive, and/or other memory information associated with the data processing system. The bus 608 may be an interconnection between various circuits and/or structures of the data processing system. The video display 610 may provide graphical representation of information on the data processing system. The alpha-numeric input device 612 may be a keypad, a keyboard and/or any other input device of text (e.g., a special device to aid the physically handicapped). The cursor control device 614 may be a pointing device such as a mouse.

The drive unit 616 may be the hard drive, a storage system, and/or other longer term storage subsystem. The signal generation device 618 may be a bios and/or a functional operating system of the data processing system. The network interface device 620 may be a device that may perform interface functions such as code conversion, protocol conversion and/or buffering required for communication to and from the network 626. The machine readable medium 622 may provide instructions on which any of the methods disclosed herein may be performed. The instructions 624 may provide source code and/or data code to the processor 602 to enable any one/or more operations disclosed herein.

FIG. 7 is a table view 750 of occupant details in the geo-spatial environment, according to one embodiment. Particularly, FIG. 7 illustrates a name field 702, a profile status field 704, a unit data field 706, a pointer type field 708 and a marker status field 710, according to one embodiment.

The name field 702 may display the name(s) of the occupant(s) represented through the set of markers associated with the shared structure (e.g., the structure 122 of FIG. 1). The profile status field 704 may show whether the profiles associated with the occupants are claimed or unclaimed. The unit data field 706 may display information associated with the address data of the occupants. The pointer type field 708 may display the type of group pointer (e.g., the residential group pointer 800 and/or office group pointer 802 of FIG. 8, a commercial group pointer and/or a industrial group pointer) used to represent the set of colliding markers associated with the different shared structures in the geo-spatial environment. The marker status field 710 may indicate whether the marker representing the occupant is locked or unlocked.

In the example embodiment illustrated in FIG. 7, the name field 702 displays "Laura D'Silva" in the first row and "Jane" in the second row of the name field column 702. The profile status field 704 displays "Claimed" in the first row and "Unclaimed" in the second row of the profile status field column 704. The unit data field 706 displays "5$^{th}$ floor" in the first row and the second row of the unit data field column 706. The pointer type field 708 displays "Commercial" in the first row and "Residential" in the second row of the pointer type field column 708. The marker status field 710 displays "Locked" in the first row and "Unlocked" in the second row of the marker status field column 710.

Figure 8:
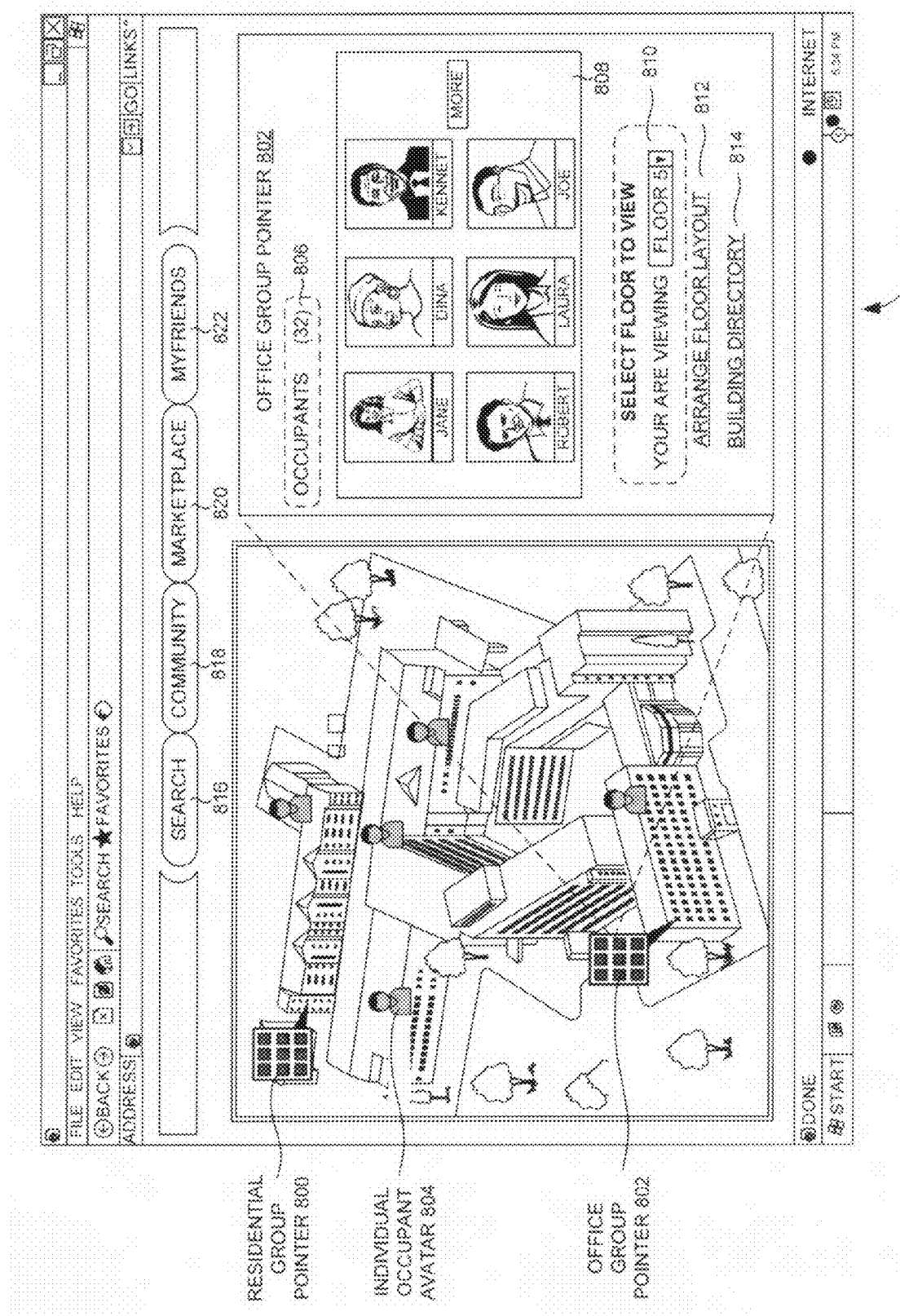
FIG. 8 is a user interface view of a multi occupant pointer view in the geo-spatial environment, according to one embodiment.

FIG. 8 is a user interface view of a multi occupant pointer view 850 in the geo-spatial environment (e.g., the geo-spatial environments 118A-N illustrated in FIG. 1), according to one embodiment. Particularly, FIG. 8 illustrates a residential group pointer 800, an office group pointer 802, an individual occupant avatar 804, an occupants label 806, a block 808, a select floor to view option 810, an arrange floor layout option 812, a building directory 814, a search link 816, a community link 818, a marketplace link 820, and a my friends link 822, according to one embodiment.

The residential group pointer 800 may represent a set of overlapping markers associated with the occupants of the shared residential structure. The office group pointer 802 may represent a set of overlapping markers associated with occupants of an office. The individual occupant avatar 804 may indicate a marker representing an individual occupant in a structure of the geo-spatial environment (e.g., the geo-spatial environments 118A-N of FIG. 1). The occupants label 806 may display the number of occupants associated with the shared structure in the geo-spatial environment.

The block 808 may display the profiles of the occupants associated with the office when the user selects the office group pointer 802. The select floor to view option 810 may enable the users of the geo-spatial environment (e.g., the geo-spatial environments 118A-N of FIG. 1) to select from different floors of the office to visualize the profiles of the occupants of the office through the office group pointer 802. The arrange floor layout option 812 may enable the occupants to create a layout of a particular floor of the office using the floor constructor wiki. The building directory 814 may provide information (e.g., name, address, floor number, contact details, etc.) associated with the occupants of the office. The search link 816 may enable the users to search and access the profiles of occupants through the group pointer (e.g., the group pointer 904B of FIG. 10).

The community link 818 may enable the occupants to form different social and/or professional groups with the other occupants of the shared structure in the geo-spatial environment. The marketplace link 820 may enable commerce (e.g., through the commerce module 128 of FIG. 1) among the occupants of the shared structure through the community bulletin board. The my friends link 822 may offer information associated with friends of the occupant of the shared structure in the geo-spatial environment (e.g., the geo-spatial environments 118A-N of FIG. 1).

In the example embodiment illustrated in FIG. 8, the user interface view may enable the users of the geo-spatial environment to access the profiles associated with the occupants through the office group pointer 802. The multi occupant pointer view 850 displays number of occupants in the office through the occupants label 806. A grouping interface may be provided (e.g., through the groups module 132 of FIG. 1) to the occupants of the shared structure to form social, professional, and/or collective purchasing groups with the other occupants of the shared structure in the geo-spatial environment.

Figure 9:
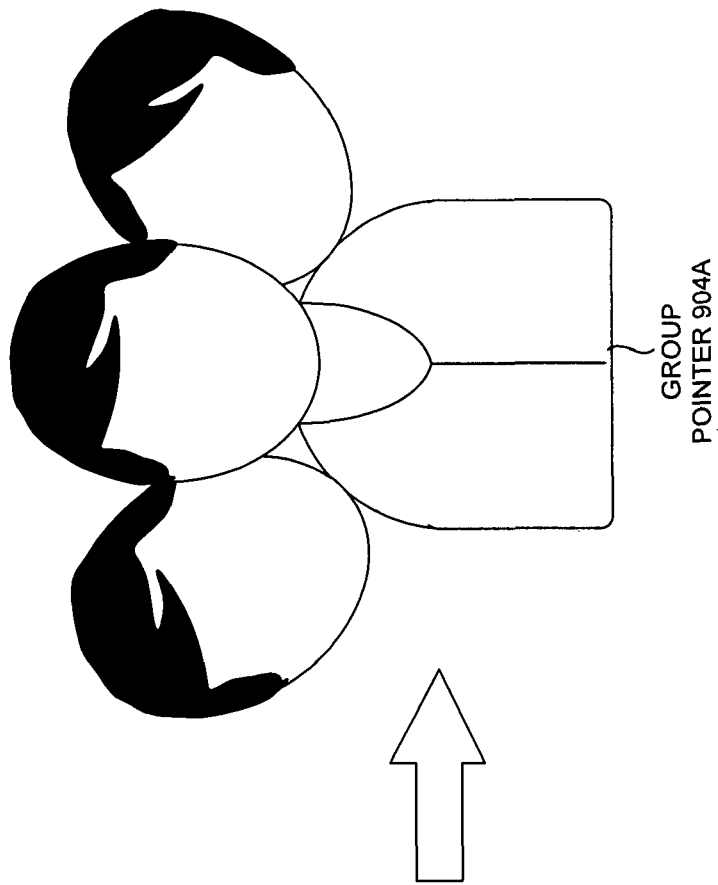
FIG. 9 is a schematic representation of replacing colliding markers with a group pointer in the geo-spatial environment, according to one embodiment.
Figure 9:
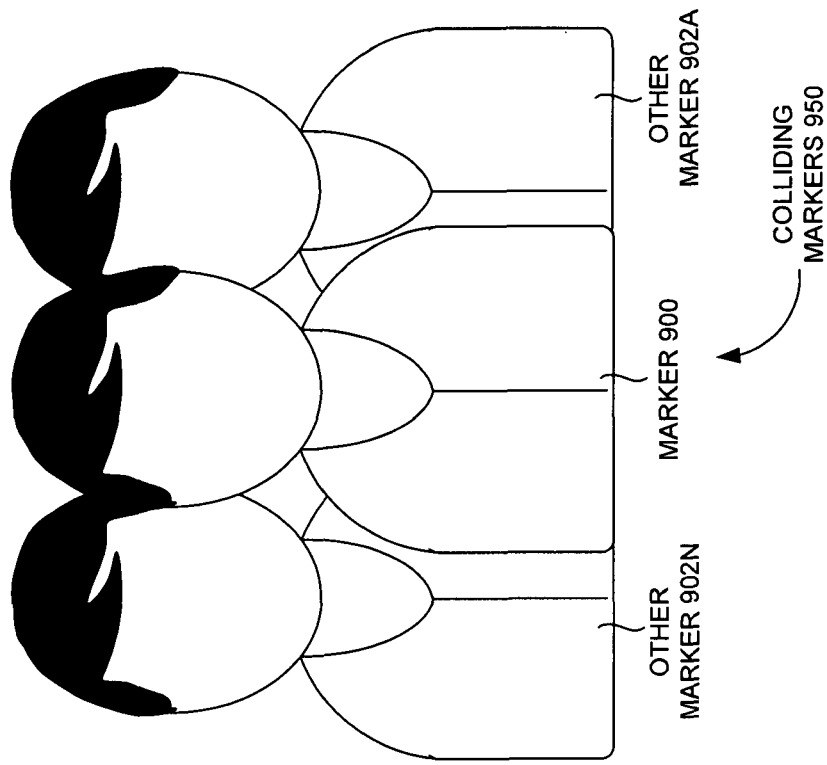

FIG. 9 is a schematic representation of replacing colliding markers 950 with a group pointer 904A in the geo-spatial environment. Particularly, FIG. 9 illustrates a marker 900, other markers 902A-N and a group pointer 904A, according to one embodiment.

The marker 900 and the other markers 902A-N may be a set of colliding markers representing the occupants of the shared structure(s) displayed simultaneously on a map in the geo-spatial environment (e.g., the geo-spatial environments 118A-N of FIG. 1). The group pointer 904A may represent the colliding markers associated with the various occupants of the structure(s) in the geo-spatial environment.

The schematic representation as illustrated in the example embodiment of FIG. 9 shows the automatic creation of the group pointer 904A to replace the set of colliding markers 950 representing the occupants associated with the shared structure(s) in the geo-spatial environment.

The marker colliding with another marker simultaneously displayed in the map may be determined based on the overlap area of the marker with the another marker. The group pointer (e.g., the group pointer 904A of FIG. 9) that replaces the marker and the another marker on the map may be automatically created. The set of markers may be placed in the map, and/or may be displayed simultaneously with each other in the map based on location data associated with each of the set of markers.

FIG. 10 is a schematic representation of replacing a set of overlapping markers 1050 with a group pointer 904B in the geo-spatial environment, according to one embodiment. The group pointer 904B may represent the various occupants in the shared structure(s) having the same location data (e.g., address data) in the geo-spatial environment. The overlapping markers 1050 may be a set of markers representing the occupants of the shared structure(s) and having the overlap area when the location data associated with the occupants is the same.

In the example embodiment illustrated in FIG. 10, the schematic representation shows the automatic creation of the group pointer 904B to replace the set of overlapping markers 1050 in the geo-spatial environment (e.g., the geo-spatial environments 118A-N of FIG. 1). The users of the geo-spatial environment may select the group pointer 904B to generate a view of the overlapping markers 1050 so that users access the profiles of the occupants having the same location data.

The view of the marker and the another marker may be generated when a user selects the group pointer. The pointer may be created when different ones of the set of markers overlap with each other because of having the same location data and/or the adjacent location data with each other.

Figure 11:
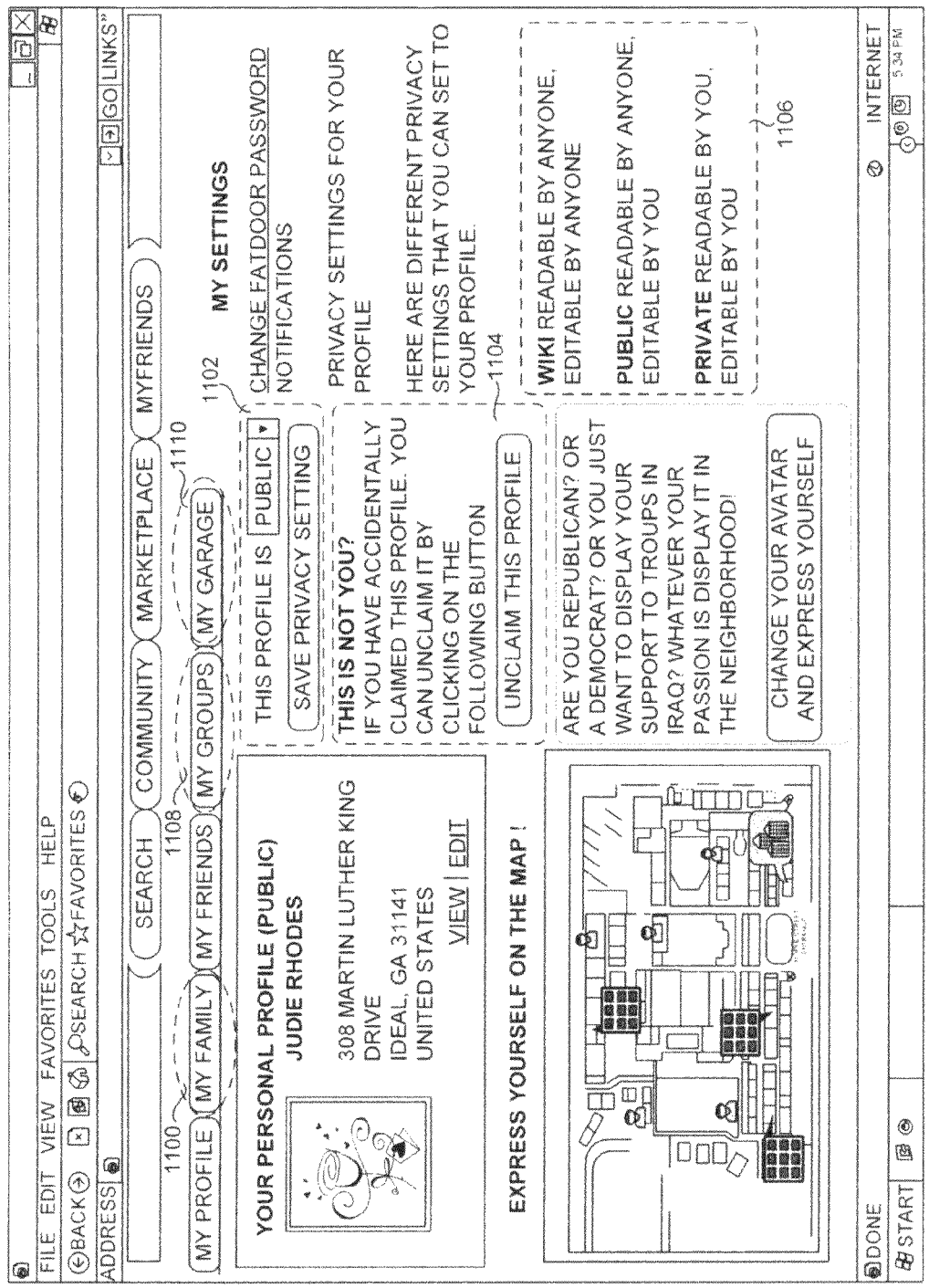
FIG. 11 is a user interface view of an occupant's profile associated with the shared structure in the geo-spatial environment, according to one embodiment.

FIG. 11 is a user interface view of an occupant's profile associated with the shared structure in the geo-spatial environment, according to one embodiment. Particularly, FIG. 11 illustrates a my family link 1100, an option 1102, an unclaim this profile option 1104, a block 1106, a my groups link 1108 and a my garage link 1110, according to one embodiment.

The my family link 1100 may enable the users to visualize information associated with the family members of the occupant of the shared structure in the geo-spatial environment. The option 1102 may indicate status of a profile associated with the occupant of the shared structure. The unclaim this profile option 1104 may enable the occupant to un-claim the profile if the occupant has accidentally claimed that profile. The block 1106 may offer information associated with different profile modes (e.g., wiki, public, private) to the users of the geo-spatial environment.

The my groups link 1108 may provide an interface where the occupant of the shared structure form social, professional and/or collective purchasing groups with other occupants of the shared structure in the geo-spatial environment. The my garage link 1110 may offer information about goods and/or services that the occupant wishes to sell to other users of the geo-spatial environments 118A-N.

In the example embodiment illustrated in FIG. 11, the user interface view 1150 displays the profile of the occupant represented through the group pointer. The users of the geo-spatial environment may add content to the profile until the profile is claimed by the particular occupant. The block 1106 displays that the wiki profile is readable and editable by the other users, the public profile is readable but not editable by the other users and the private profile is readable and editable only by the person who claims the profile. The user interface view 1150 may enable the occupant of the shared structure to un-claim the claimed profile through the unclaim the profile option 1104.

Figure 12A:
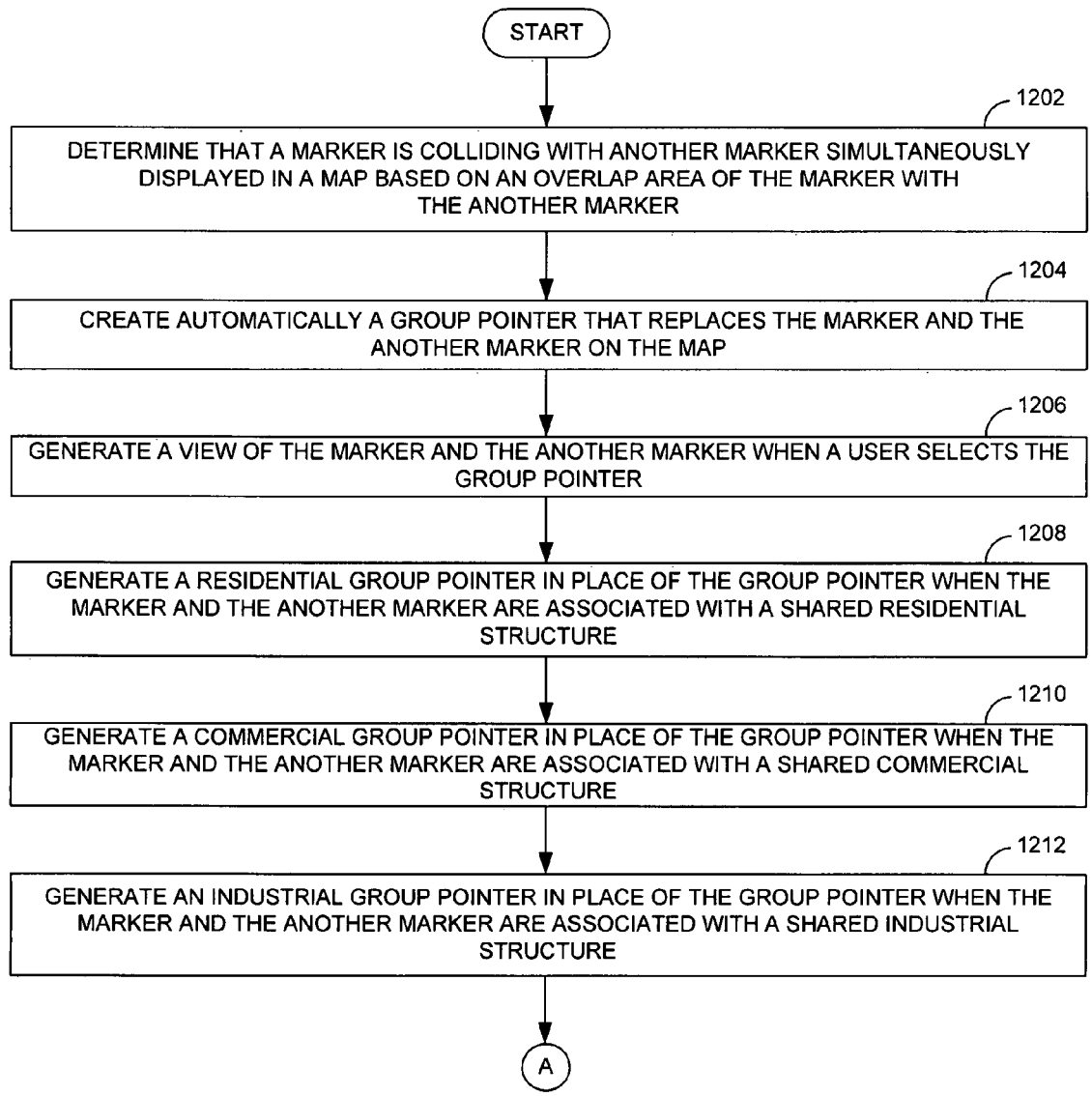
FIG. 12A is a process flow of automatically creating the group pointer that replaces colliding markers in the geo-spatial environment, according to one embodiment.

FIG. 12A is a process flow of automatically creating a group pointer to replace colliding markers in the geo-spatial environment, according to one embodiment. In operation 1202, it may be determined that a marker is colliding with another marker simultaneously displayed in a map based on an overlap area of the marker with the another marker. In operation 1204, the group pointer (e.g., the group pointer 904A of FIG. 9) that replaces the marker and the another marker on the map may be automatically created. In operation 1206, a view of the marker and the another marker may be generated when a user selects the group pointer.

In operation 1208, a residential group pointer (e.g., the residential group pointer 800 of FIG. 8) may be generated in place of the group pointer when the marker and the another marker are associated with a shared residential structure. In operation 1210, a commercial group pointer may be generated in place of the group pointer when the marker and the another marker are associated with a shared commercial structure. In operation 1212, an industrial group pointer may be generated in place of the group pointer when the marker and the another marker are associated with a shared industrial structure.

Figure 12B:
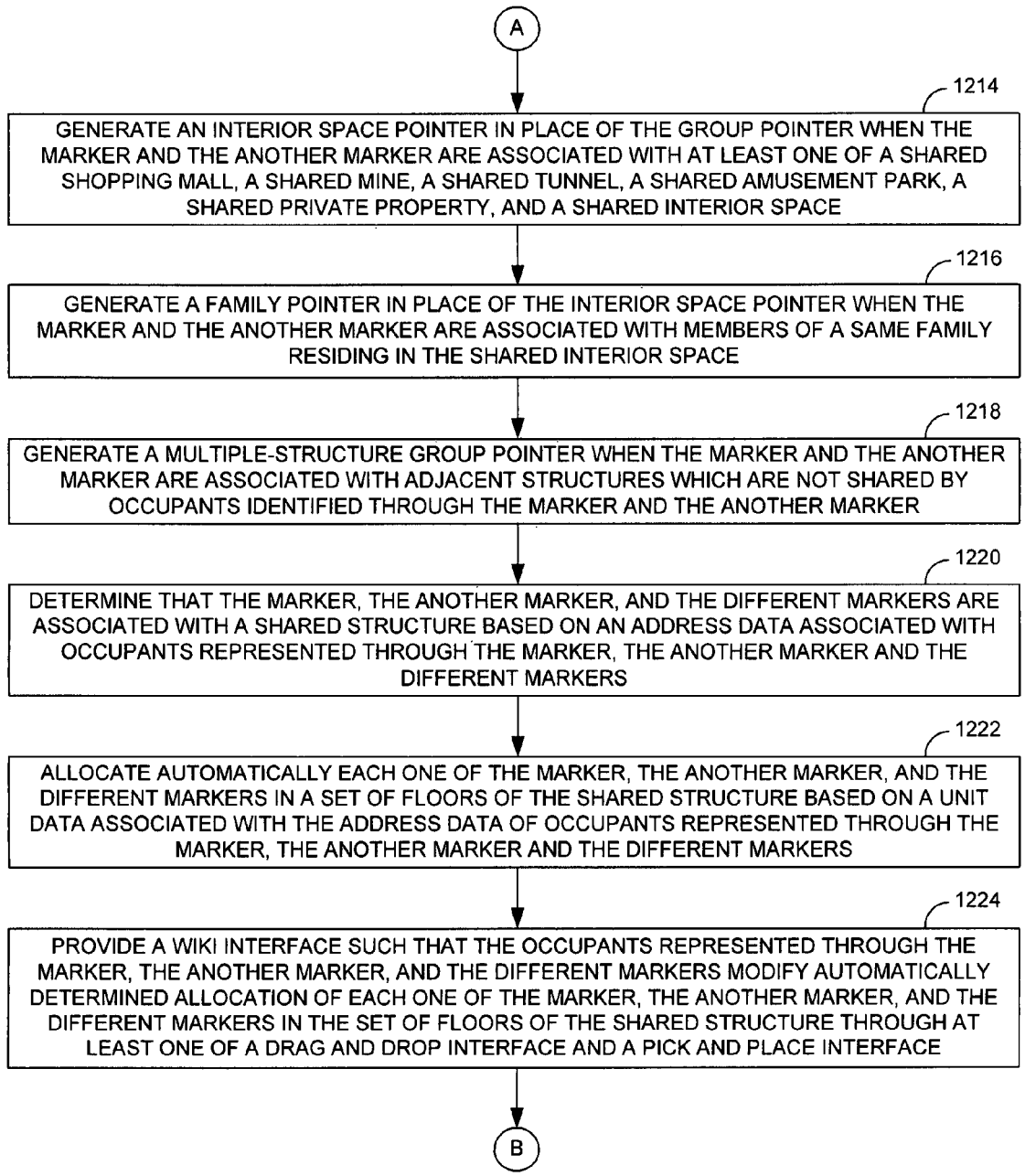
FIG. 12B is a continuation of the process flow of FIG. 12A, showing additional processes, according to one embodiment.

FIG. 12B is a continuation of the process flow of FIG. 12A, showing additional processes, according to one embodiment. In operation 1214, an interior space pointer may be generated in place of the group pointer when the marker and the another marker are associated with a shared shopping mall, a shared mine, a shared tunnel, a shared amusement park, a shared private property, and/or a shared interior space. In operation 1216, a family pointer may be generated in place of the interior space pointer when the marker and the another marker are associated with members of a same family residing in the shared interior space. In operation 1218, a multiple-structure group pointer may be generated when the marker and the another marker are associated with adjacent structures which are not shared by occupants identified through the marker and the another marker.

In operation 1220, it may be determined that the marker, the another marker, and the different markers are associated with a shared structure based on an address data associated with occupants represented through the marker, the another marker, and the different markers. In operation 1222, each one of the marker, the another marker, and the different markers may be allocated automatically in a set of floors of the shared structure based on a unit data associated with the address data of occupants represented through the marker, the another marker and the different markers. In operation 1224, a wiki interface may be provided (e.g., through the wiki module 124 of FIG. 1) such that the occupants represented through the marker, the another marker, and the different markers modify automatically determined allocation of each one of the marker, the another marker, and the different markers in the set of floors of the shared structure through at least one of a drag-and-drop interface and/or a pick-and-place interface.

Figure 12C:
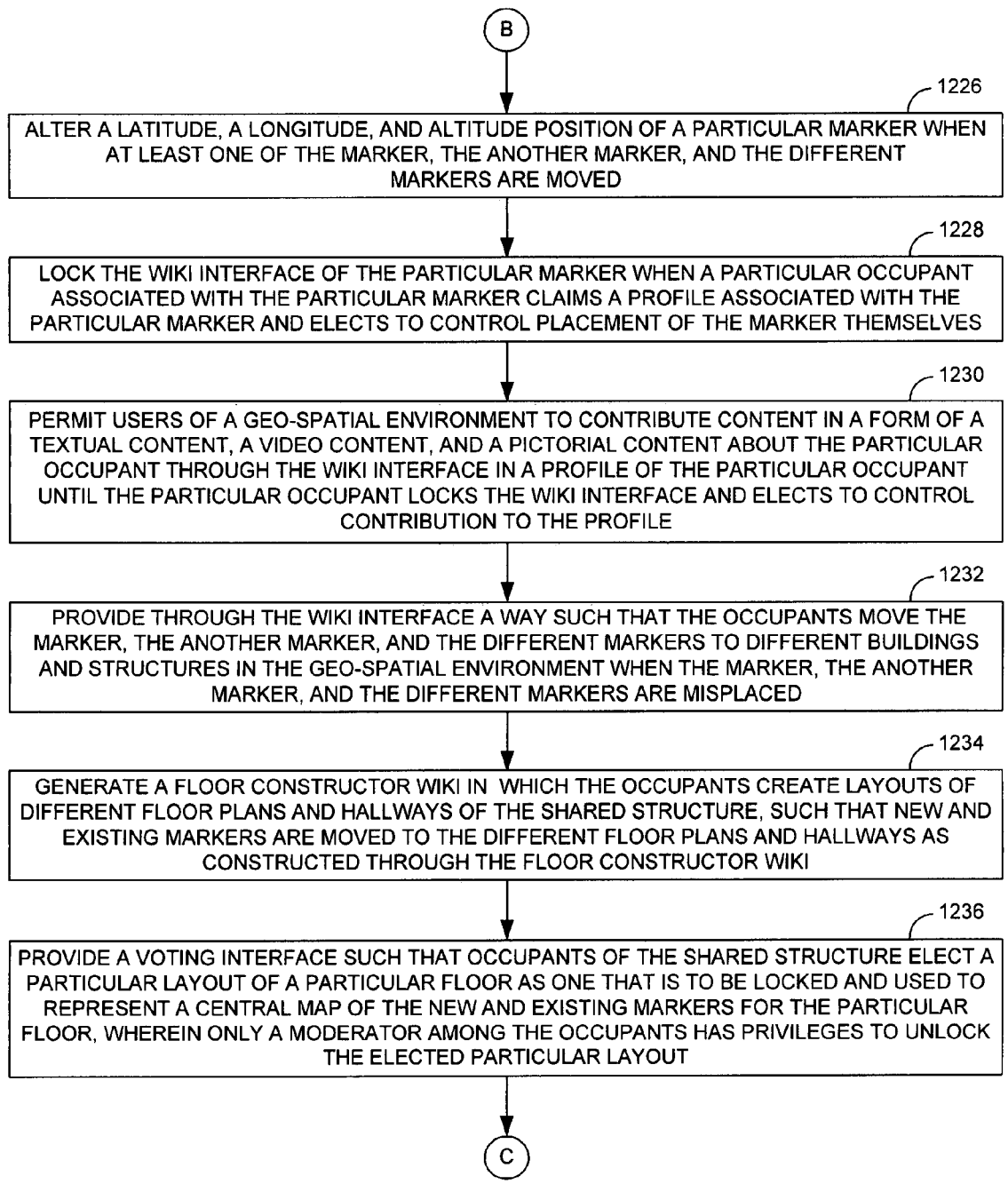
FIG. 12C is a continuation of the process flow of FIG. 12B, showing additional processes, according to one embodiment.

FIG. 12C is a continuation of the process flow of FIG. 12B, showing additional processes, according to one embodiment. In operation 1226, a latitude, a longitude and/or an altitude position of a particular marker may be altered when the marker, the another marker, and/or the different markers are moved. In operation 1228, the wiki interface of the particular marker may be locked when a particular occupant associated with the particular marker claims a profile associated with the particular marker and elects to control placement of the marker themselves.

In operation 1230, users of a geo-spatial environment (e.g., the geo-spatial environments 118A-N of FIG. 1) may be permitted to contribute content in a form of a textual content, a video content, and/or a pictorial content about the particular occupant through the wiki interface in a profile of the particular occupant until the particular occupant locks the wiki interface and elects to control contribution to the profile. In operation 1232, a way may be provided through the wiki interface such that the occupants move the marker, the another marker, and the different markers to different buildings and/or structures in the geo-spatial environments when the marker, the another marker, and the different markers are misplaced.

In operation 1234, a floor constructor wiki (e.g., provided by the floor constructor module 126 of FIG. 1) may be generated in which the occupants create layouts (e.g., the layout 504 of FIG. 5) of different floor plans and/or hallways of the shared structure such that new and/or existing markers are moved to the different floor plans and/or hallways as constructed through the floor constructor wiki. In operation 1236, a voting interface may be provided (e.g., through the voting module 130 of FIG. 1) such that occupants of the shared structure elect a particular layout of a particular floor as one that is to be locked and used to represent a central map of the new and/or existing markers for the particular floor.

Figure 12D:
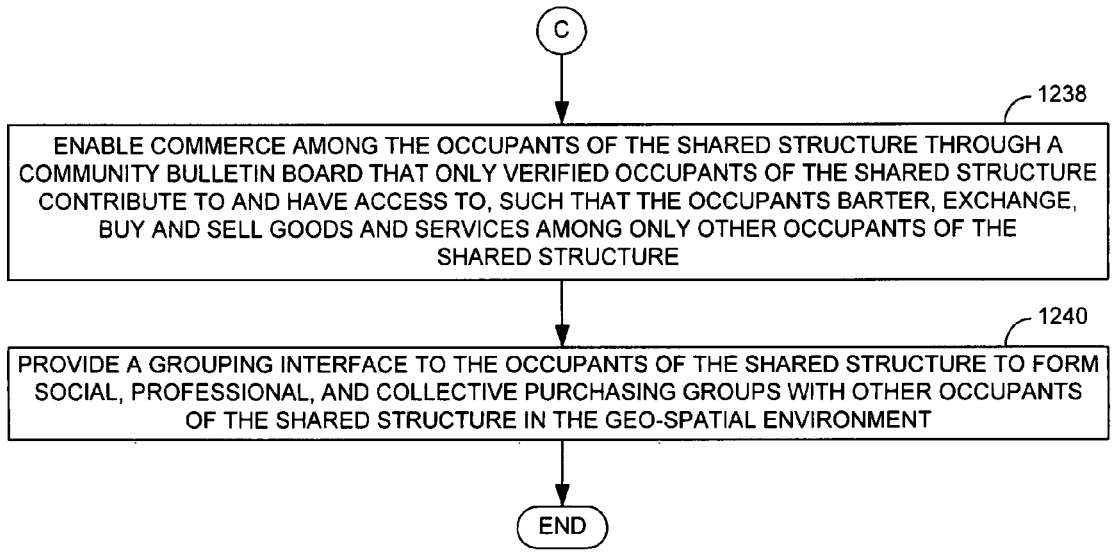
FIG. 12D is a continuation of the process flow of FIG. 12C, showing additional processes, according to one embodiment.

FIG. 12D is a continuation of the process flow of FIG. 12C, showing additional processes, according to one embodiment. In operation 1238, commerce may be enabled among the occupants of the shared structure through a community bulletin board that only verified occupants of the shared structure contribute to and have access to, such that the occupants barter, exchange, buy and/or sell goods and/or services among only other occupants of the shared structure. In operation 1240, a grouping interface may be provided (e.g., by the groups module 132 of FIG. 1) to the occupants of the shared structure to form social, professional, and/or collective purchasing groups with other occupants of the shared structure in the geo-spatial environment.

Figure 13:
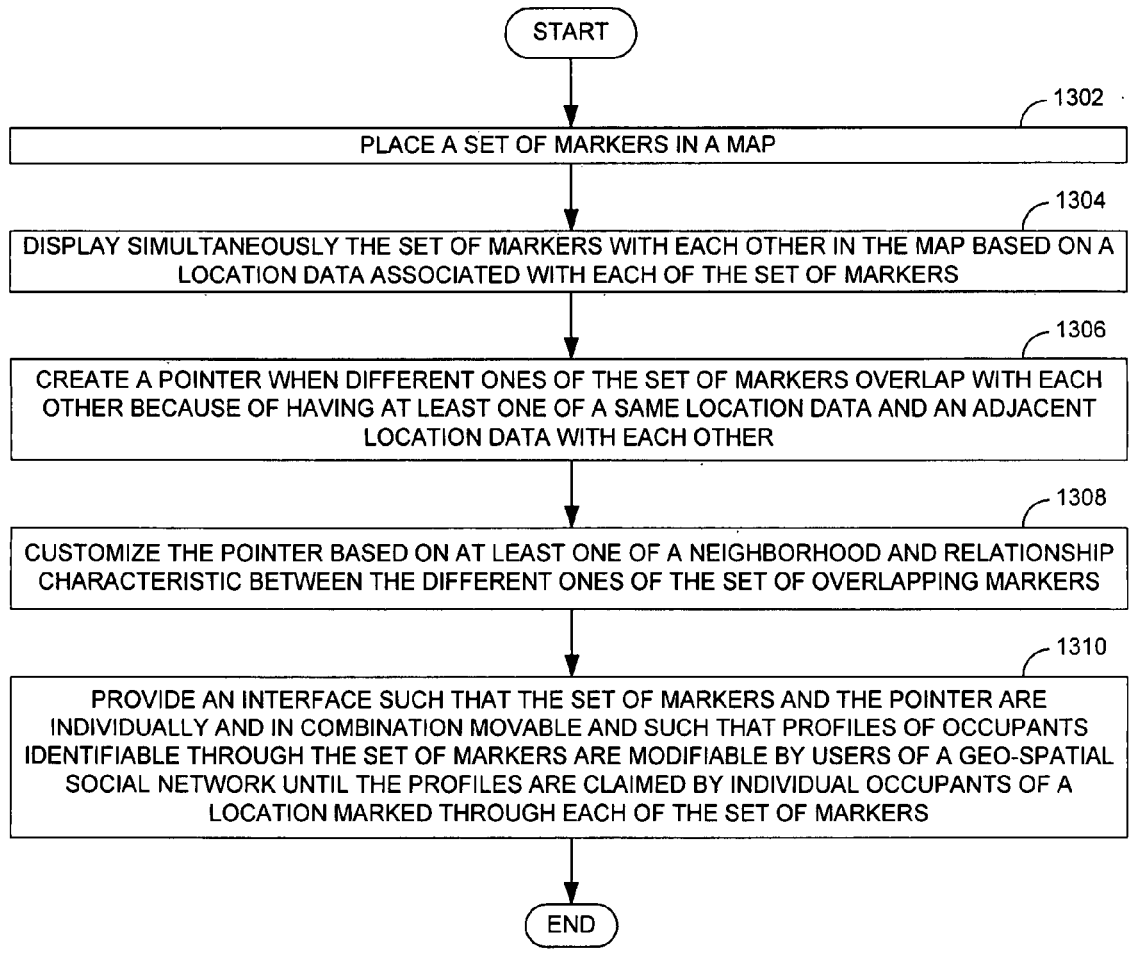
FIG. 13 is a process flow of placing a pointer representing a set of markers on a map, according to one embodiment.

FIG. 13 is a process flow of placing a pointer representing a set of markers on a map, according to one embodiment. In operation 1302, a set of markers may be placed in a map. In operation 1304, the set of markers may be simultaneously displayed with each other in the map based on a location data associated with each of the set of markers. In operation 1306, a pointer (e.g., the pointer 120 of FIG. 1) may be created when different ones of the set of markers overlap with each other because of having a same location data and an adjacent location data with each other.

In operation 1308, the pointer may be customized based on a neighborhood and/or a relationship characteristic between the different ones of the set of overlapping markers. In operation 1310, an interface may be provided (e.g., through the wiki module 124 of FIG. 1) such that the set of markers and the pointer (e.g., the pointer 120 of FIG. 1) are individually and/or in combination moveable and such that profiles of occupants identifiable through the set of markers are modifiable by users of a geo-spatial social network until the profiles are claimed by individual occupants of a location marked through each of the set of markers.

Although the present embodiments have been described with reference to specific example embodiments, it will be evident that various modifications and changes may be made to these embodiments without departing from the broader spirit and scope of the various embodiments. For example, the various devices, modules, analyzers, generators, etc. described herein may be enabled and operated using hardware circuitry (e.g., CMOS based logic circuitry), firmware, software and/or any combination of hardware, firmware, and/or software (e.g., embodied in a machine readable medium). For example, the various electrical structures and methods may be embodied using transistors, logic gates, and electrical circuits (e.g., application specific integrated ASIC circuitry and/or in Digital Signal; Processor DSP circuitry).

For example, the central module 100, the structure module 102, the identification module 104, the visualization module 106, the marker module 108, the collision module 110, the profile module 112, the wiki module 124, the floor constructor module 126, the commerce module 128, the voting module 130, the groups module 132, the display module 202, the image upload module 204, the meta-data module 206, the search module 208 and other modules of FIGS. 1-13 may be enabled using a central circuit, a structure circuit, an identification circuit, a visualization circuit, a marker circuit, a collision circuit, a profile circuit, a wiki circuit, a floor construction circuit, a commerce circuit, a voting circuit, a groups circuit, a display circuit, an image upload circuit, a meta-data circuit, a search circuit and other circuits using one or more of the technologies described herein.

In addition, it will be appreciated that the various operations, processes, and methods disclosed herein may be embodied in a machine-readable medium and/or a machine accessible medium compatible with a data processing system (e.g., a computer system), and may be performed in any order. Accordingly, the specification and drawings are to be regarded in an illustrative rather than a restrictive sense.

What is claimed is:

1. A method comprising:
   determining, using a processor of a computing device, that a marker is colliding with another marker simultaneously displayed in a map based on an overlap area of the marker with the another marker;
   automatically creating a group pointer that replaces the marker and the another marker on the map;
   generating a view of the marker and the another marker when a user selects the group pointer; and
   generating a multiple-structure group pointer when the marker and the another marker are associated with adjacent structures which are not shared by occupants identified through the marker and the another marker.

2. The method of claim 1 further comprising:
   generating a residential group pointer in place of the group pointer when the marker and the another marker are associated with a shared residential structure;
   generating a commercial group pointer in place of the group pointer when the marker and the another marker are associated with a shared commercial structure;
   generating an industrial group pointer in place of the group pointer when the marker and the another marker are associated with a shared industrial structure;
   generating an interior space pointer in place of the group pointer when the marker and the another marker are associated with at least one of a shared shopping mall, a shared mine, a shared tunnel, a shared amusement park, a shared private property, and a shared interior space; and
   generating a family pointer in place of the interior space pointer when the marker and the another marker are associated with members of a same family residing in the shared interior space.

3. The method of claim 1 further comprising determining that the marker, the another marker, and different markers are associated with a shared structure based on an address data associated with occupants represented through the marker, the another marker and the different markers.

4. The method of claim 3 further comprising automatically allocating each one of the marker, the another marker, and the different markers in a set of floors of the shared structure based on a unit data associated with the address data of the occupants represented through the marker, the another marker and the different markers.

5. The method of claim 4 further comprising providing a wiki interface such that the occupants represented through the marker, the another marker, and the different markers modify automatically determined allocation of each one of the marker, the another marker, and the different markers in the set of floors of the shared structure through at least one of a drag and drop interface and a pick and place interface.

6. The method of claim 5 further comprising altering a latitude, a longitude, and altitude position of a particular marker when at least one of the marker, the another marker, and the different markers are moved.

7. The method of claim 6 further comprising locking the wiki interface of the particular marker when a particular occupant associated with the particular marker claims a profile associated with the particular marker and elects to control placement of the marker themselves.

8. The method of claim 7 further comprising permitting users of a geo-spatial environment to contribute content in a form of a textual content, a video content, and a pictorial content about the particular occupant through the wiki interface in the profile of the particular occupant until the particular occupant locks the wiki interface and elects to control contribution to the profile.

9. The method of claim 5 further comprising providing through the wiki interface a way such that the occupants move the marker, the another marker, and the different markers to different buildings and structures in a geo-spatial environment when the marker, the another marker, and the different markers are misplaced.

10. The method of claim 9 further comprising generating a floor constructor wiki in which the occupants create layouts of different floor plans and hallways of the shared structure, such that new and existing markers are moved to the different floor plans and hallways as constructed through the floor constructor wiki.

11. The method of claim 10 further comprising providing a voting interface such that occupants of the shared structure elect a particular layout of a particular floor as one that is to be locked and used to represent a central map of the new and existing markers for the particular floor, wherein only a moderator among the occupants has privileges to unlock the elected particular layout.

12. The method of claim 11 further comprising enabling commerce among the occupants of the shared structure through a community bulletin board that only verified occupants of the shared structure contribute to and have access to, such that the occupants barter, exchange, buy and sell goods and services among only other occupants of the shared structure.

13. The method of claim 12 further comprising providing a grouping interface to the occupants of the shared structure to form social, professional, and collective purchasing groups with the other occupants of the shared structure in the geospatial environment.

14. A non-transitory computer readable medium containing instructions that when executed by a processor of a computing device cause the processor to:
   determine that a marker is colliding with another marker simultaneously displayed in a map based on an overlap area of the marker with the another marker;
   automatically create a group pointer that replaces the marker and the another marker on the map;
   generate a view of the marker and the another marker when a user selects the group pointer; and
   determine that the marker, the another marker, and different markers are associated with a shared structure based on address data associated with occupants represented through the marker, the another marker and the different markers.

15. A system comprising:

one or more memories configured to store executable code; and one or more processors operably coupled to the one or more memories and configured to execute the executable code to:

determine that a marker is colliding with another marker simultaneously displayed in a map based on an overlap area of the marker with the another marker;

automatically create a group pointer that replaces the marker and the another marker on the map;

generate a view of the marker and the another marker when a user selects the group pointer; and generate a multiple-structure group pointer when the marker and the another marker are associated with adjacent structures which are not shared by occupants identified through the marker and the another marker.

* * * * *